Jan. 3, 1956  R. L. HOLLOWAY  2,729,077
CONSTANT TORQUE COUPLING
Filed Feb. 11, 1953  2 Sheets-Sheet 1
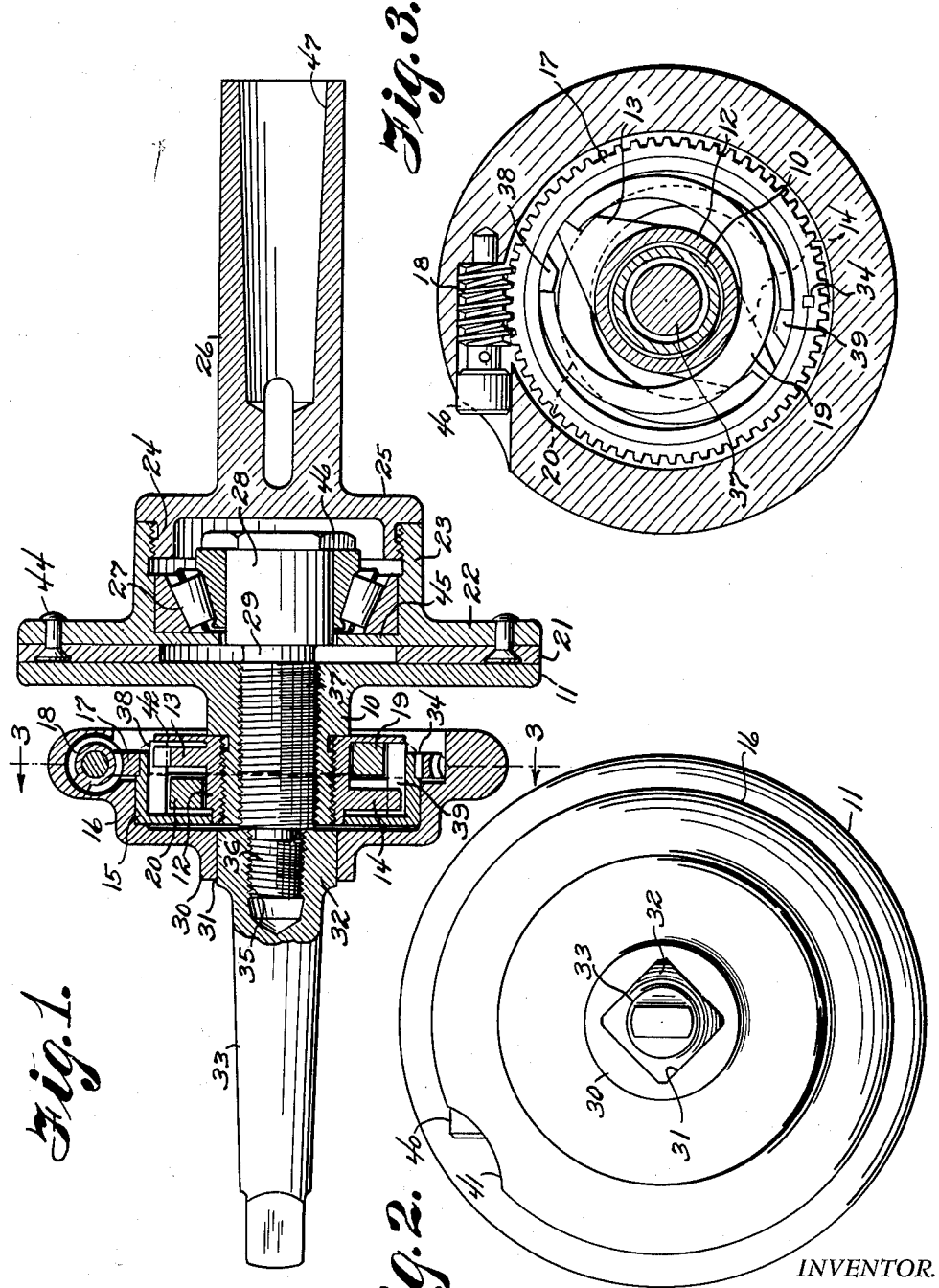
INVENTOR.
Robert L. Holloway
BY Victor J. Evans & Co.
ATTORNEYS Jan. 3, 1956    R. L. HOLLOWAY    2,729,077
CONSTANT TORQUE COUPLING
Filed Feb. 11, 1953    2 Sheets-Sheet 2

INVENTOR.
Robert L. Holloway
BY Victor J. Evans & Co.
ATTORNEYS

United States Patent Office 2,729,077
Patented Jan. 3, 1956

2,729,077
CONSTANT TORQUE COUPLING
Robert L. Holloway, Snyder, N. Y.
Application February 11, 1953, Serial No. 336,297
2 Claims. (Cl. 64—30)

This invention relates to friction clutches or couplings used in various types of transmission particularly where constant force on friction engaging elements and also constant slippage is desirable, and in particular a power transmission element having a friction disc positioned between flanges with means for controlling the torque wherein the force necessary to obtain slip on the disc remains constant irrespective of changes in the co-efficient of friction due to static vs. sliding friction, wet or dry surfaces, lubricated or unlubricated parts, changes in atmospheric conditions, or the like.

The purpose of this invention is to provide a constant torque friction type coupling which, having been set to a pre-determined torque setting, will start to slip and continue to slip at that torque and only at that torque within approximately plus or minus 5% of accuracy, irrespective of the variable friction conditions such as static, sliding, wet, dry, lubricated, unlubricated, hot or cold, or the like.

When two surfaces are pressed together with a normal force, the force required to slide one surface upon the other is equal to the normal force multiplied by the co-efficient or friction; for example, should the surfaces be pressed together with a normal force of 250 pounds and the co-efficient of friction .15, the force required to slide one surface over the other would be 37.5 pounds. Due to atmospheric conditions and other causes as hereinbefore stated the co-efficient of friction does not remain the same and consequently the friction force varies. In numerous instances it is desirable to maintain constant torque whereby the surfaces will slip at the same torque irrespective of atmospheric and other conditions.

With this thought in mind this invention contemplates a torque cartridge in combination with a friction clutch or coupling and means in the cartridge whereby the torque output is automatically maintained and allows adjustment, over a wide range, of the torque to be so controlled.

The object of this invention is, therefore, to provide means for incorporating a controlling element in a friction clutch or coupling whereby the torque required to effect slippage between elements is manually adjustable and automatically controlled to maintain the torque setting, so adjusted.

Another object of the invention is to provide a torque coupling in combination with a friction clutch or coupling wherein the torque coupling automatically adjusts its operating parts to compensate for changes in the co-efficient of friction due to atmospheric and other conditions.

A further object of the invention is to provide a constant torque element in combination with a friction coupling or clutch in which the torque element is of a simple and economical construction.

With these and other objects and advantages in view the invention embodies driving and driven elements with a flange having an extended hub threaded on a sleeve on the driving element and connected to the driving element through a torque device in which the torque is adjustable by a worm and gear, and a friction disc carried by a hub on the driven element and positioned to engage the flange of the sleeve on the driving element.

Other features and advantages of the invention will appear from the following description taken in connection with the drawing, wherein:

Figure 1 is a longitudinal section through the constant torque coupling, with a stub shaft therein and part of the driving element shown in elevation.

Figure 2 is an end elevational view of the coupling looking toward the driving end thereof.

Figure 3 is a cross section through the torque adjusting part of the coupling taken on line 3—3 of Figure 1 and showing in particular the worm and gear for adjusting the torque.

Figure 4:
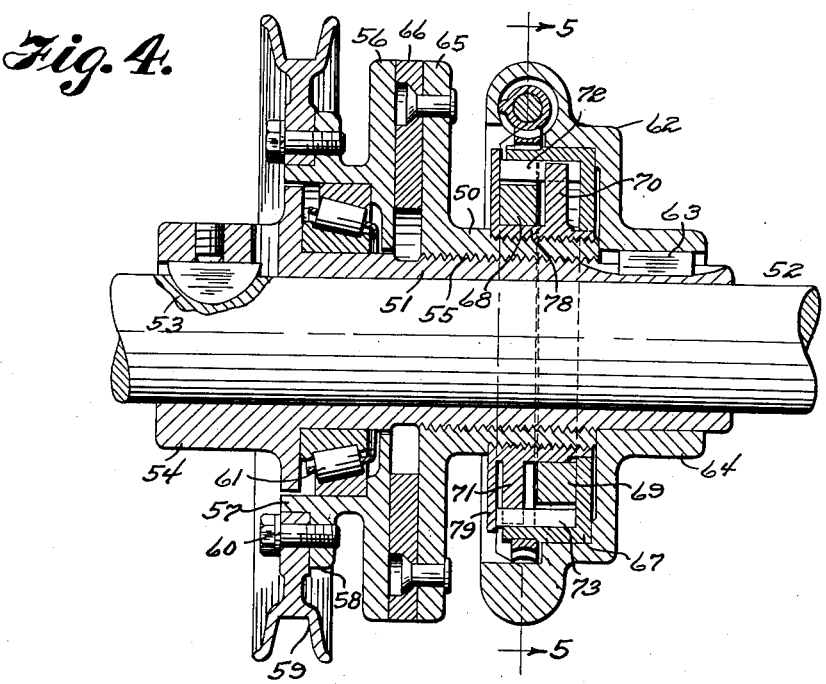
Figure 4 is also a longitudinal section through the constant torque coupling illustrating a modification wherein the device is mounted upon a shaft which provides the driving element and the driven element is in the form of a pulley or sheave mounted on the friction clutch element.

Referring now to the drawings wherein like reference characters denote corresponding parts the constant torque coupling of this invention includes a hub 10 having a circular flange 11 on one end with a sleeve 12 having spring engaging lugs 13 and 14 on its opposite end, an inner cylindrical casing 15 positioned around the lugs 13 and 14 and journaled in a torque coupling housing 16, a worm gear 17 carried by the casing 15 and positioned to mesh with a worm 18 journaled in the housing 16, springs 19 and 20 in the casing 15 and positioned with one of the ends thereof in engagement with the lugs 13 and 14, of the sleeve 12, and with the opposite ends in engagement with lugs 38 and 39 on the inner surface of the casing 15, and lugs 38 and 39 of the inner casing 15, a friction disc 21, carried by a flange 22, of a hub 23 which, in the design shown in Figures 1, 2 and 3 is threaded on a section 24 extended from a flange 25 of a driven element 26, which provides a housing for a bearing 27 of a head 28 of a stub shaft 29.

In the design shown in Figures 1, 2 and 3 the housing 16 is provided with a hub 30 having a square opening 31 therein and the opening 31 is positioned on a square section 32 of a shank 33 which may be formed to provide the driving element such as a standard tapered machine tool spindle.

The square section 32 of the shank 33 is provided with a threaded bore 35 into which a threaded stud 36 of the stub shaft 29 is threaded, the thread of the stud 36 being opposite hand to the torque, limiting direction of rotation of the coupling.

The hub 10 is threaded with a high lead thread on the intermediate section 37 of the stub shaft 29 and the reaction of the friction force from the friction plate 21 to the driving flange 11 tends to rotate the flange 11 in the hub 10 backward on the section 37 of the stub shaft against slight deflection of the springs 19 and 20 in the torque cartridge housing 16.

The inner casing 15 is provided with lugs or keys 38 and 39 which coact with the lugs 13 and 14 to regulate or adjust the tension or torque on the crescent-shaped spring members 19 and 20, the torque being adjusted by rotating the worm 18 with the socket of the head 40, that extends through a recess 41 in the housing 16. The sleeve 12 is provided with an inner flange 42 which provides a closure for the end of the inner casing 15 and which is positioned to engage a shoulder 43 of the hub 10.

The gear 17 is mounted in an annular recess in the casing 15 and a key 34 prevents rotation of the gear on the casing.

The friction disc 21 is secured to the flange 22 with rivets 44 and the bearing 27 is retained in the hub of the flange 22 with an inwardly extended annular web 45. The inner race of the bearing is retained on the head 28 of the stud 29 with a flange or nut 46.

The driven element of the design illustrated in Figures 1, 2 and 3 is in the form of a female member having a Morse taper socket 47 in the extended end.

It will be noted that both the driving and driven elements are readily removed and replaced with substantially any type of input and output members.

With the parts arranged in this manner the driving elements rotate the driven element through the friction clutch members comprising the flanges 11 and 22 and the friction disc 21 and when the force reaches a slip point the hub 10 has a tendency to back up on the threaded section 37, slightly compressing the springs 19 and 20 which control the torque desired at the point of slip, and this torque is adjusted by rotating the worm gear 17 with the worm 18.

As illustrated in Figure 3, one end of the spring member 19 is in engagement with the lug 13 of the sleeve 12 and the opposite end in engagement with the lug 38. The oppositely disposed spring member 20 is positioned with one end in engagement with the lug 14 of the sleeve 12 and the other in engagement with the lug 39 of the casing 15. Both of the spring members, therefore, coact to develop the torque.

Figure 5:
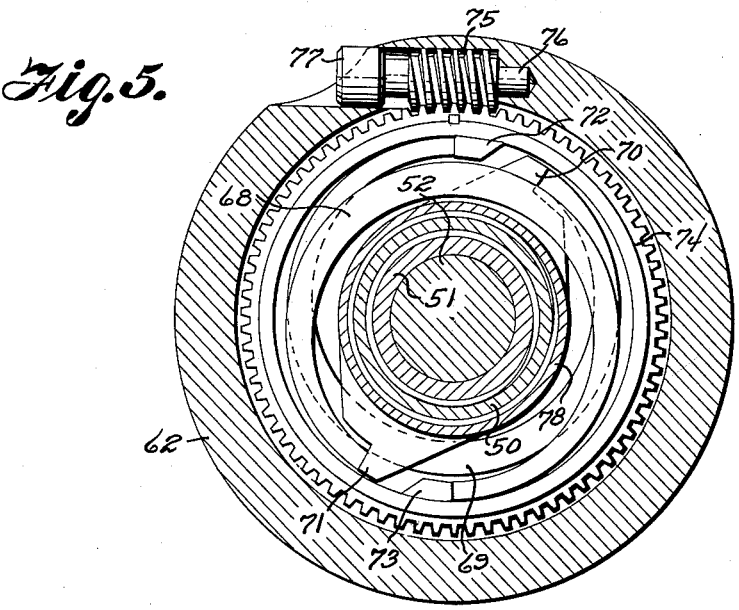
Figure 5 is a cross section through the torque adjusting section of the clutch taken on line 5—5 of Figure 4.

In the design illustrated in Figures 4 and 5 a hub 50, similar to the hub 10 is mounted on an extended sleeve 51 that is keyed to a shaft 52 with a key 53 in a hub 54 of the sleeve and, also similar to the design shown in Figure 1, the hub 50 is threaded on the sleeve 51 with a high lead thread as indicated at the point 55.

In the design shown in Figures 4 and 5 a flange 56, similar to the flange 22 is provided with a hub 57 having an annular web 58 to which a pulley 59 is secured with bolts 60.

The hub 57 is journaled on the sleeve 51 with a bearing 61 and with a housing 62 of the torque element, similar to the housing 16, keyed to the sleeve 51 with a key 63 in a hub 64 of the housing, the driving power is transmitted from the shaft 52 through the sleeve 51 to the housing 62 and through the torque element to the flange 65 on the hub 50. The force is transmitted from the friction disc 66 to the flange 56 upon which the pulley 59 is mounted.

The friction disc 66 is secured to the flange 65 with rivets 67 and the torque housing 62 is provided with an inner casing 67, 68 and 69, torque spring engaging lugs 70 and 71, lugs 72 and 73 on casing 68, a worm gear 74 and a worm 75. The worm 75 is mounted on a shaft or spindle 76 having a head or socket 77 and the lugs 70 and 71 are carried by a sleeve 78 that is threaded on the hub 50. The sleeve 78 is provided with an inner flange 79.

In the torque clutch of this design the torque, and consequently the slip is controlled by turning the worm 75 whereby the pulley 59 is driven with the shaft 52 and the point of slip or torque is readily controlled, similar to that of the design shown in Figures 1, 2 and 3.

It will be understood that modifications, within the scope of the appended claims, may be made in the design and arrangement of the parts without departing from the spirit of the invention.

What is claimed is:

1. In a torque coupling, a hub provided with a circular flange on one end thereof, a sleeve arranged on the other end of said hub and provided with spring engaging lugs thereon, a casing positioned around said lugs, a housing surrounding said casing, a worm gear carried by said casing, a worm journaled in said housing and meshing with said worm gear, springs positioned in said casing and having an end thereof engaging the lugs of said sleeve, lugs on the inner surface of said casing engaging the other ends of said springs, said housing being provided with a hub having a square opening therein, a driving element including a square section positioned in said square opening, said square section being provided with a threaded bore, a shaft including an intermediate section provided with a high lead thread for threadedly engaging said first named hub, said shaft having a stud arranged in engagement with said bore, a driven element including an extended section, a flange including a cylindrical hub secured to said extended section, and a friction disc secured to said last named flange and arranged contiguous to the flange on said first named hub.

2. In a torque coupling, a hub provided with a flange on one end thereof, a sleeve arranged on the other end of said hub and provided with spring engaging lugs thereon, a casing positioned around said lugs, a housing surrounding said casing, a worm gear carried by said casing, a worm journaled in said housing and meshing with said worm gear, resilient means positioned in said casing and engaging the lugs of said sleeve, lugs on said casing engaging said resilient means, said housing being provided with a hub having an opening therein, a driven element including a section positioned in said last named opening, said section being provided with a threaded bore, a shaft including an intermediate section provided with a high lead thread for threadedly engaging said first named hub, said shaft having a stud arranged in engagement with said bore, a driven element including an extended section, a flange including a hub secured to said extended section, and a friction disc secured to said last named flange and arranged contiguous to the flange on said first named hub.

References Cited in the file of this patent

UNITED STATES PATENTS

| | | |
|---|---|---|
| 1,174,920 | Wilson et al. | Mar. 7, 1916 |
| 2,151,724 | Wengel et al. | Mar. 28, 1939 |
| 2,468,193 | Goff | Apr. 26, 1949 |